(12) United States Patent
Kozolchyk et al.

(10) Patent No.: US 9,596,244 B1
(45) Date of Patent: Mar. 14, 2017

(54) SECURING SERVICES AND INTRA-SERVICE COMMUNICATIONS

(75) Inventors: Jonathan Kozolchyk, Seattle, WA (US); Darin Keith McAdams, Seattle, WA (US); Jeffrey J Fielding, Seattle, WA (US); Vaibhav Mallya, Seattle, WA (US); Darren E. Canavor, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 561 days.

(21) Appl. No.: 13/162,343

(22) Filed: Jun. 16, 2011

(51) Int. Cl.
*H04L 29/02* (2006.01)
*H04L 29/06* (2006.01)

(52) U.S. Cl.
CPC ............ *H04L 63/105* (2013.01); *H04L 63/10* (2013.01)

(58) Field of Classification Search
CPC ... H04L 63/10; H04L 63/101; H04L 41/5003; H04L 51/046; H04L 63/0227; H04L 67/141; G06F 17/30082
See application file for complete search history.

(56) References Cited

U.S. PATENT DOCUMENTS

| | | | |
|---|---|---|---|
| 6,178,508 B1 | 1/2001 | Kaufman | |
| 7,757,271 B2 * | 7/2010 | Amdur et al. | 726/1 |
| 7,783,745 B1 | 8/2010 | Bhargava et al. | |
| 8,006,312 B2 | 8/2011 | Nakamura | |
| 8,447,983 B1 | 5/2013 | Beck et al. | |
| 8,458,487 B1 | 6/2013 | Palgon et al. | |
| 8,495,243 B2 | 7/2013 | Bellamy, III et al. | |
| 2002/0087340 A1 * | 7/2002 | Boubez et al. | 705/1 |
| 2003/0033398 A1 * | 2/2003 | Carlson et al. | 709/223 |
| 2004/0019571 A1 | 1/2004 | Hurwitz et al. | |
| 2004/0091116 A1 * | 5/2004 | Staddon et al. | 380/277 |
| 2004/0139162 A1 * | 7/2004 | Adams et al. | 709/206 |

(Continued)

OTHER PUBLICATIONS

Non-Final Office Action for U.S. Appl. No. 13/168,747, mailed on Dec. 7, 2012, Alexandre Karpov et al., "Monitoring Services and Service Consumers", 5 pages.

(Continued)

*Primary Examiner* — Jung Kim
*Assistant Examiner* — Tri Tran
(74) *Attorney, Agent, or Firm* — Davis Wright Tremaine LLP

(57) ABSTRACT

A security service enables service providers to register available services. Prospective service consumers may register with the security service to access a particular registered service, and may specify conditions for access that are subject to approval by the corresponding service provider. Based on the registrations of the service provider and the service consumer, the security service can define access policies that may be enforced to control the conditions under which a service consumer accesses or utilizes the particular service. Additionally, changes to the access policies may be propagated to running services in near real time. Some implementations enable masking of information provided to particular service consumers based on determined needs of each service consumer for access to particular information. In some instances, the service providers may provide log information to the security service, which may be monitored to identify anomalies, security breaches or the like.

30 Claims, 12 Drawing Sheets

(56) References Cited

U.S. PATENT DOCUMENTS

| | | |
|---|---|---|
| 2004/0153451 A1 | 8/2004 | Phillips et al. |
| 2004/0210633 A1* | 10/2004 | Brown et al. ............... 709/203 |
| 2005/0143956 A1 | 6/2005 | Long et al. |
| 2005/0165656 A1* | 7/2005 | Frederick et al. ............ 705/26 |
| 2005/0193093 A1* | 9/2005 | Mathew ............... G06Q 30/02 709/219 |
| 2005/0216241 A1 | 9/2005 | Entin et al. |
| 2005/0234745 A1 | 10/2005 | Schoenberg |
| 2006/0143688 A1 | 6/2006 | Futoransky et al. |
| 2007/0011330 A1* | 1/2007 | Dinker et al. ............... 709/226 |
| 2008/0116285 A1 | 5/2008 | Shoemaker |
| 2008/0134347 A1 | 6/2008 | Goyal et al. |
| 2009/0254355 A1* | 10/2009 | Chou et al. ....................... 705/1 |
| 2011/0258123 A1 | 10/2011 | Dawkins et al. |
| 2011/0307714 A1 | 12/2011 | Comrie et al. |
| 2012/0030744 A1 | 2/2012 | Faure et al. |

OTHER PUBLICATIONS

Office Action for U.S. Appl. No. 13/171,672, mailed on Mar. 7, 2014, Jonathan Kozolchyk, "Token-Based Secure Data Management", 22 pages.

Office action for U.S. Appl. No. 13/168,747, mailed on May 17, 2013, Karpov et al., "Monitoring Services and Service Consumers", 6 pages.

PCI Security Standards Council, "Data Storage Do's and Don'ts," Oct. 2008, retrieved https://www.pcisecuritystandards.org/pdfs/pci_fs_data_storage.pdf, 2 pages.

\* cited by examiner

Application to Request Access

Request Access to Service

Additional Information ← 402

☐ Please check if your application sends or receives secret data

Who will use the application? ← 404

☐ Consumers
☐ Merchants
☐ Software Development Engineers
☐ Managers
☐ Lawyers
☐ Others Please select your primary development center's region: ← 406

○ Region 1
○ Region 2
○ Region 3

Please enter the email address of the manager responsible for your service

← 408

CONTINUE ← 316

BACK ← 318

SECURING SERVICES AND INTRA-SERVICE COMMUNICATIONS

BACKGROUND

Traditional authentication, authorization and accounting schemes focus on granting access to a resource, such as a service. Typically, a business or other enterprise may use different standards for authentication, authorization and accounting when a client or service consumer is an internal user that is affiliated with the enterprise, as opposed to an external user that is not affiliated with the enterprise. For example, internal services are often provided free of charge to internal users as part of the enterprise's business operations. Further, because internal services are typically provided within an enterprise's network, intranet, or the like, interactions are often assumed to be secure. Consequently, the utilization of internal services by internal users may not always be well monitored, which can affect the enterprise's efficiency and security.

In addition, users of internal services may be able to access enterprise data that would never be exposed publicly, such as customer information, proprietary information, financial information, and the like. Accordingly, some enterprises may have safeguards that limit access of internal users to enterprise data. However, enforcing these safeguards may interfere with the legitimate need for access to certain information or services.

Additionally, some internal services may be used by many different service consumers for many different purposes, and internal services tend to change or evolve at a faster rate than public services. Thus, internal service providers may not be able to easily monitor how their services are being used, who is using their services, or how ongoing changes in their services affect internal users and overall security concerns.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example of a portion of a user interface for requesting access to a service according to some implementations.

DETAILED DESCRIPTION

Securing Services and Intra-Service Communications

Figure 1:
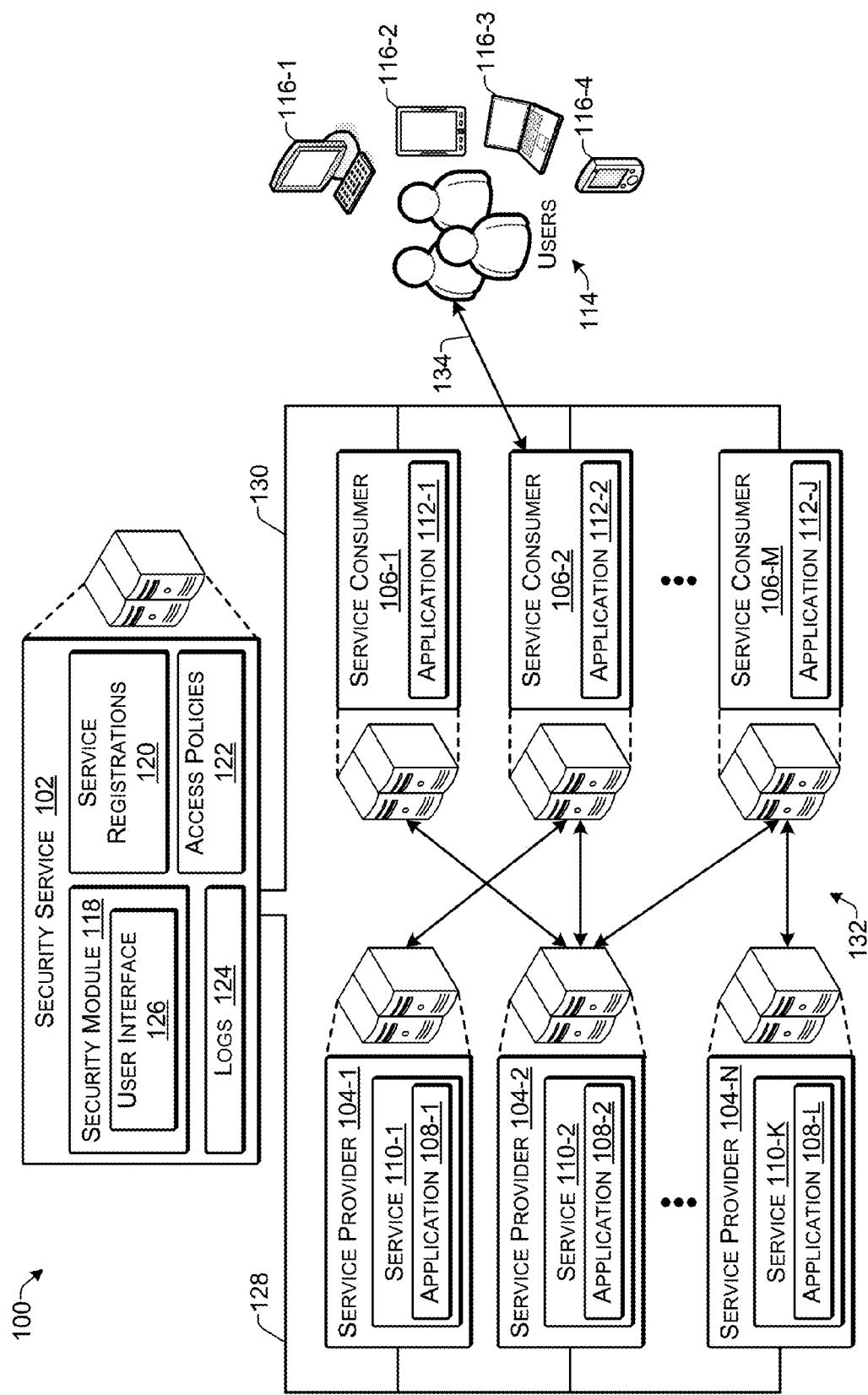
FIG. 1 illustrates an example architecture of a system for securing services and intra-service communications according to some implementations.

This disclosure includes techniques and arrangements for securing services and intra-service communications. In some implementations, a security service may enable service providers to register services that are available to be used by service consumers. When a relationship is established between a service provider and a service consumer, the service consumer assumes the role of a client to the service provider. Prospective service consumers may apply to the security service to access a registered service. In some instances, the security service may collect information from prospective service consumers, such as service consumer contact information, application programming interface (API) usage descriptions, expected amount of usage of the service, desired access conditions, desired whitelisting rules, and the like. The collected information is provided to the registered service that the service consumer desires to access to allow the service to determine whether to authorize access by the prospective service consumer. Following approval of the service consumer's application by the provider of the registered service, the security service can implement access policies that include authorization information and whitelisting rules for controlling the conditions under which the service consumer is able to access or utilize the service.

Furthermore, some instances enable near real-time propagation of access policy changes from a user interface to running services, such as in less than one minute. For example, the registered services may perform a periodic synchronization of access policies with the security service to ensure that the latest versions of the access policies are being enforced. Additionally, some implementations include the ability to broadcast access policy change events to other parties within the enterprise. For example, certain entities in the enterprise may wish to monitor which service consumers have access to which services and to which portion of those services. Accordingly, these entities may subscribe to receive broadcasts of each approved change to access policies, such as changes to whitelisting rules and access authorizations. As another example, when a service provider for a particular service needs to change how the service is accessed or change certain features of the service, these changes may be broadcasted to the registered service consumers of the service and the registered service consumer may subsequently revise how they utilize the particular service.

In addition, some implementations include the ability to label data as secure, and to allow service consumers to opt-out of receiving of receiving the secure data. Further, some implementations enable masking or redacting of information provided to particular service consumers based on determined needs of the service consumer for access to particular information. Thus, if a service is able to provide service consumers with a certain quantity of information, different service consumers invoking the same API for that service will automatically receive different information depending on the particular access policies (i.e., whitelisting settings) established for each particular service consumer with respect to the particular service. For example, suppose that a service provides customer data that may include the customer nine-digit postal code to internal service consumers that request customer information. Based on need for information pre-determined for each service consumer, a first service consumer may only be provided with only the first five digits of the nine-digit postal code when customer data is requested, while a second service consumer may be provided with the entire nine-digit postal code when customer data is requested, and a third service consumer may receive no postal code information at all when customer data is requested. In some instances, all the service consumers may call the same API to request the information using the same parameter, but may be provided different levels or different subsets of the same information based on their demonstrated need for the information, as established by the access policies. Additionally, some implementations may include a periodic "baselining" in which access permissions previously granted to service consumers expire on a periodic basis, such as annually, and the service consumers must re-verify the need to access certain information.

Furthermore, in some implementations, a service can subscribe to the security service herein and copies of log data pertaining to the service are maintained by the security service. For example, the security service can receive log information from each registered service and maintain log files pertaining to service consumer usage of the service, performance of the service, and the like. The log files may be monitored for detecting anomalies, security breaches, excessive usage of a service, and the like. For example, the security service may issue an alert to a service provider to when usage anomalies are detected.

Additionally, some implementations provide a user interface that may include a single control that can be activated by a service provider to block requests received from a particular service consumer for accessing a particular service or multiple services. Thus, the blocking of one or more selected service consumers may occur at the service level, such as when an anomaly or excessive usage is detected. In some implementations, a service provider may block a particular service consumer from accessing a particular API when the service consumer access requests exceed a predetermined threshold over the service consumer's stated expected access requests. Further, because service consumers provide expected whitelisting information, such as expected number of transactions per second, when applying for access to the registered service, a well-behaved service consumer can determine the best way to stop generating problematic requests, and thereby address at the source any actions that are causing problems for a particular service. For example, a service consumer may implement throttling of access requests issued to a particular service to maintain the requests within the expected number of requests specified when the service consumer applied for access to the service.

Example Architecture

FIG. 1 illustrates an example architecture of a system 100 that includes a security service 102 for securing services and intra-service communications according to some implementations. The security service 102 is able to communicate with a plurality of service providers 104-1, 104-2, . . . , 104-N and a plurality of clients or service consumers 106-1, 106-2, . . . , 106-M. For example, each service provider 104 may have one or more service provider applications 108-1, 108-2, . . . , 108-L that provide one or more services 110-1, 110-2, . . . , 110-K to one or more service consumer applications 112-1, 112-2, . . . , 1124 at each service consumer 106. Furthermore, as will be explained additionally below, in some instances a service consumer 106 of one service 110 may itself be a service provider 104 of another service 110 to another service consumer 106. Thus, in some implementations, a single application may act in dual roles by being both a service provider application 108 that provides a service 110 to a service consumer 106, while also being a service consumer application 112 that utilizes a service 110 provided by another service provider 104.

Additionally, in some instances, one or more of the service consumers 106 may provide services to end users 114, such as internal users (e.g., employees of an enterprise) or external users such as customers, potential customers and other members of the public. For example, the end-users may access one of the service consumers 106, such as service consumer 106-2, using any of a variety of devices such as personal computers or workstations 116-1, e-book readers and tablet devices 116-2, laptop computers 116-3, cellular telephones and smart phones 116-4, or any other suitable devices. The service consumer 106-2 may access one or more service providers 104 when providing a service itself to the users 114. Thus, in some implementations, the service providers 104 may provide internal services to the service consumers 106, and one or more service consumers 106 may provide an external service to a user 114.

The security service 102 may include a security module 118 to perform the functions and features described herein for securing services and intra-service communications. For example, the security module 118 may receive registration requests from the service providers 104 for registering the services 110 with the security service 102. Thus, the security service 102 may receive a service registration 120 for each service 110 to be secured by the security service 102. Furthermore, as described additionally below, the security module 118 may determine access policies 122, such as whitelisting information and the like, for each service 110 with respect to each service consumer 106. Additionally, the security module 118 may manage and maintain logs 124 regarding the use of each service 110 by each service consumer 106. For example, as described additionally below, the security service 102 may provide data from the logs 124 for review by an authorized party, such as the associated service provider 104. Alternatively, the security service 102 may internally review the log information to identify any anomalies or use conditions that may warrant providing an alert to a particular service.

The security module 118 may further include a user interface 126 that is accessible by the service providers 104 for registering their services 110. The user interface 126 is also accessible by the service consumers 106 to submit a request to access to a particular registered service 110. Additional details and functions of the user interface 126 are discussed below.

The service providers 104 may communicate with the security service 102 through one or more communication links 128; the service consumers 106 may communicate with the security service 102 through one or more communication links 130; the service providers 104 may communicate with the service consumers 106 through one or more communication links 132; and the service consumers 106 may communicate with the users 114 through one or more communication links 134. Each of these communication links 128, 130, 132, 134 may be the same communication link or different communication links. For example, the communications links 128-134 may be any of a direct connection, a local area network (LAN), a wide area network (WAN), a virtual private network (VPN) or any combination thereof, and may include both wired and wireless communication technologies using any suitable protocols and communication techniques. In some implementations, the security service 102, service providers 104 and service consumers 106 may be located at a data center, server farm or other single physical location, while in other implementations, the security service 102, service providers 104 and service consumers 106 may be located in diverse locations that are physically remote from one another and the communication links 128-134 may include the Internet or other long distance communication network.

Example Framework

Figure 2:
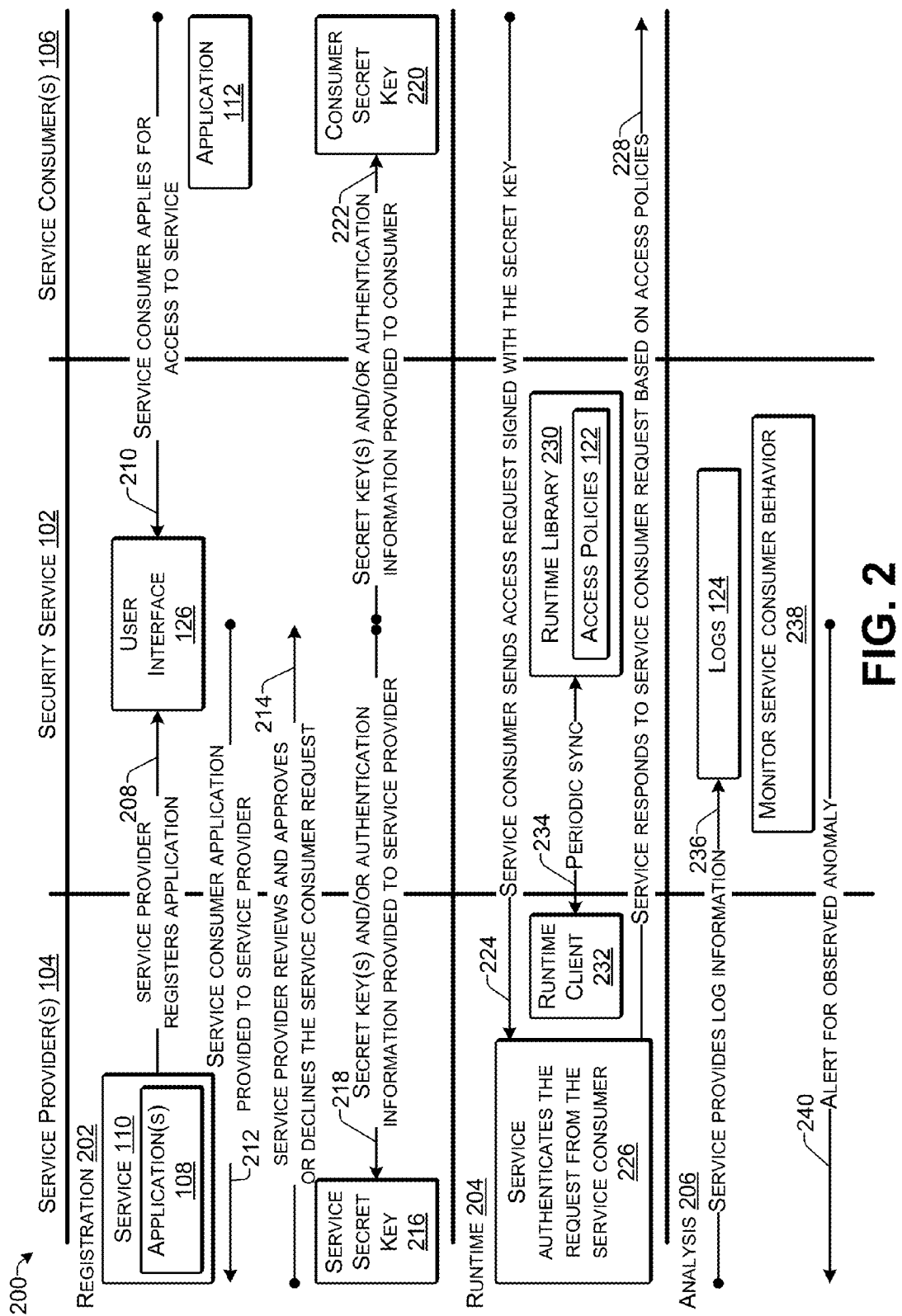
FIG. 2 illustrates an example framework for service registration, secure service access, and service usage analysis according to some implementations.

FIG. 2 illustrates an example framework 200 demonstrating selected interactions between the security service 102, one or more service providers 104 and one or more service consumers 106 according to some implementations. The framework 200 may be executed in the architecture 100 described above or other suitable architectures. Each service provider 104 may provide one or more of the services 110, while each service consumer 106 may consume one or more of the services 110. In the illustrated example, interactions may take place during a registration stage 202, a runtime stage 204 and an analysis stage 206. Through execution of the framework 200, the security service 102 facilitates determination and enforcement of a particular instance of the service 110 that the service provider 104 agrees to provide to a particular service consumer 106.

The security service 102 enables the one or more service providers 104 to register one or more services 110 with the security service 102. In the illustrated example, as indicated by arrow 208, a service provider 104 registers the application 108 with the security service 102 to provide the service 110. For example, the service provider 104 may access the user interface 126 of the security service 102 to register the service application 108 with the security service 102. During the registration, the service provider 104 may supply information pertaining to the service 110, such as service name, service interfaces, service properties, information to be collected from prospective service consumers, and so forth.

A service consumer 106 may request access to the service 110 provided by service application 108, as indicated by arrow 210. For example, the service consumer 106 may access the security service user interface 126 to search for needed services, select a service 110 to access, and provide requested information for gaining access to the selected service. For instance, the security service 102 may require the service consumer 106 to describe why the service consumer needs to access the particular service, how the service will be accessed, how often the service will be accessed, how critical the service is to the service consumer's operations, particular APIs of the service that need to be accessed, contact information for the service consumer, and so forth. In some implementations, the service consumer 106 may identify the service consumer application 112, or specific features thereof, that will access the service 110.

The security service 102 may provide the request for access 210 received from the service consumer 106 to the service provider 104 for approval, as indicated by arrow 212. For example, the service provider 104 may periodically check the user interface 126 for any new service consumer requests for access to the service 110. Alternatively, in some implementations, the security service 102 may send a notification to the service provider 104 that one or more service consumer access requests 210 have been received and are pending approval. The service provider 104 may review the request for access 210 and approve or decline the request, as indicated by arrow 214. For example, the service provider 104 may review the request for access 210 using the user interface 126. Alternatively, the request for access and the associated service consumer information may be sent to the service provider 104 for review, such as by an electronic communication, and the service provider 104 may reply to the security service 102 with an accept or decline message. Furthermore, in some instances, the service provider 104 may request that the service consumer 106 provide more information prior to the service provider 104 accepting or declining the service consumer registration request. In this scenario, the service consumer 106 may then use the security service user interface 126 to provide the additional requested information.

When the service provider 104 accepts the service consumer's request for access, authentication information may be provided to the service provider 104 and the service consumer 106 to be used for communications between the service provider 104 and the service consumer 106. For example, a service secret key 216 and/or other authentication information may be provided to the service provider 104, as indicated by arrow 218. Similarly, a consumer secret key 220 and/or other authentication information may be provided to the service consumer 106, as indicated by arrow 222. In some implementations, the service secret key 216 and the consumer secret key 220 may be a shared secret key that is shared between the particular service provider 104 and the particular service consumer 106. For example, the service provider 104 may receive and maintain a different secret key 216 for each service consumer 106 that is authorized to access a particular service and/or API. Similarly, the service consumer 106 may receive and maintain a different secret key for each service and/or API that the service consumer 106 is authorized to access. In some instances, the security service 102 may itself manage the distribution of secret keys and authentication information; however, in other implementations, a key management service (not shown in FIG. 2) may perform this task.

During the runtime stage 204, when the service consumer 106 desires to access the service 110, the service consumer 106 sends an access request to the service provider 104 and signs the access request with the consumer secret key 220, as indicated by arrow 224. As indicated at block 226, the service 110 receives the access request and performs authentication to ensure that access request is from a service consumer that is registered and permitted to access the service 110. For example, the service provider 104 may use the service secret key 216 to check the validity of the signature included with the access request 224. When the service provider 104 determines that the access request 224 is from an authorized service consumer 106, the service 110 may respond, as indicated at arrow 228, to the service consumer's access request by providing requested information or by performing some other service.

Furthermore, the response 228 provided to the service consumer 106 may be in accordance with whitelisting rules and other access policies 122, as maintained in a runtime library 230 or other suitable data structure. For example, when the service provider first registers the service 110, the security service 102 may provide a runtime client 232 to the service provider 104. The runtime client 232 may include the runtime library 230, or at least portions thereof relevant to the particular service, such as the access policies 122 relevant to the particular service 110. The runtime client 232 may perform periodic synchronization of its access policies 122 with the runtime library 242 maintained by the security service 102, as indicated by arrow 234. Thus, the periodic sync enables the access policies for the service to remain current as to which service consumers are authorized to access the service, the latest access policies and whitelisting rules for each service and service consumer, and the like. For example, the periodic sync 234 may be performed at a suitable interval such as every minute, every 30 seconds, or any other suitable interval. In some implementations, the runtime client 232 at the service provider 104 initiates the periodic sync 234 at each periodic interval using a pull model for obtaining any relevant new information from the runtime library 230; however, in other implementations, the security service 102 may push the periodic sync 234 to each service provider 104 for each registered service 110. The runtime client 232 may review incoming parameters of the access request 224 received from the service consumer 106 and determine, based at least in part on the access policies 122, whether to allow the access request 224 from the service consumer 106. For example, the runtime client 232 may determine whether the service consumer 106 is an authorized service consumer based on the access policies 122, and may further determine whether the service consumer 106 is authorized to obtain the particular information, or only a portion thereof, requested by the access request 224.

The analysis stage 206 may take place contemporaneously with the runtime stage 204, or any time thereafter. For example, as the service provider 104 interacts with one or more service consumers 106, the service provider 104 may provide log information to the security service 102 as indicated by arrow 236. For example, the runtime client 232 may automatically provide the security service 102 with log information 236 to be stored in one or more logs 124 for each service 110 registered with the security service 102. Accordingly, log information may be recorded for each service consumer access request received by the service provider 104, and this information may be transferred to the security service 102. In some implementations, as indicated at block 238, the security service 102 may monitor the behavior of service consumers with respect to a particular service to determine whether there are any anomalies, apparent improper use, unauthorized access requests, and so forth. For example, when the security service 102 determines that there is an anomaly the security service 102 may send an alert to the corresponding service provider 104, as indicated by arrow 240. In some implementations, rather than the security service 102 monitoring and reviewing the logs 124, the log information for a particular service, or for all services, may be provided to the associated service provider 104 or an authorized third-party to review the logs 124 for anomalies or other areas of concern.

Example User Interface

Figure 3:
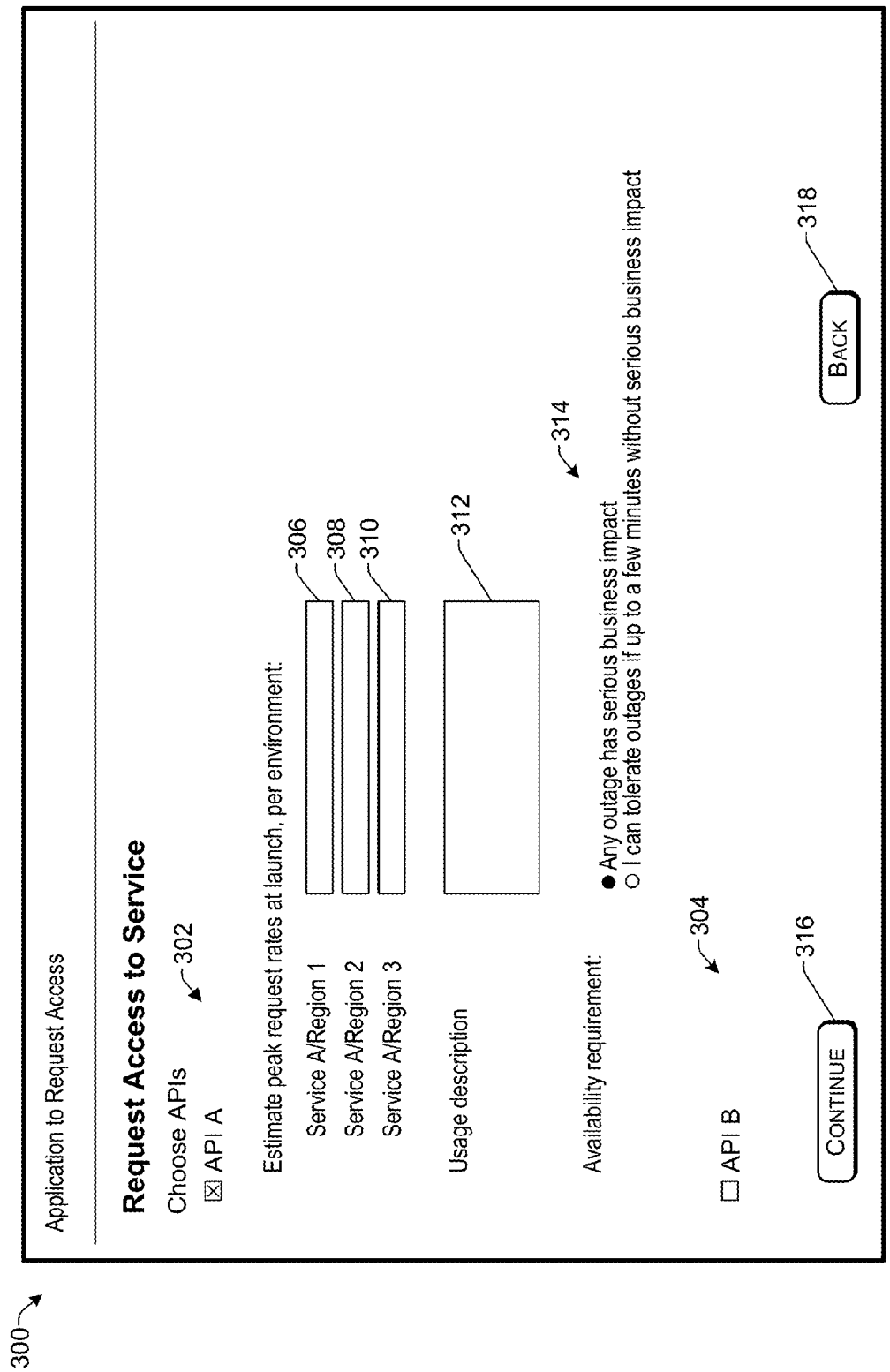
FIG. 3 illustrates an example of a portion of a user interface for requesting access to a service according to some implementations.

FIG. 3 illustrates an example user interface portion 300 that a service consumer may use for requesting access to a particular service according to some implementations. The user interface portion 300 may correspond to part of the security service user interface 126 discussed above with respect to FIGS. 1 and 2. For example, after the service consumer 106 has identified the service 110 to which access is desired, the security service 102 may present the user interface portion 300 to the service consumer 106 to determine whitelisting rules and other access policies 122 to apply to this service consumer 106 for this service 110. For instance, the security service 102 can determine which APIs provided by the service the service consumer 106 might desire to access, how frequently the service consumer may desire to access each API, who will have access to the information provided by the service, the criticality of the service to the service consumer, and so forth.

In the illustrated example, the service consumer 106 may use the user interface 300 to select one or more APIs of the service that the service consumer will access while using the service. For instance, suppose that the available APIs for this service include an API A 302 and an API B 304. In this example, the service consumer 106 has selected the API A 302, and is presented with requests for additional information regarding the intended use of this API. Thus, the user interface portion 300 may request an estimate of peak access request rates (e.g., peak number of transactions per second) that the service consumer expects to submit to the API A 302 for a service A in one or more service locations or regions, as indicated by data entry box 306 for Region 1, data entry box 308 for Region 2, and data entry box 310 for Region 3. Further, the user interface portion 300 may request a usage description from the service consumer 106, as indicated by data entry box 312 to enable the prospective service consumer 106 to describe to the service provider 104 how and why the information from the particular API A 302 will be used. Additionally, the user interface 300 may request the availability requirements 314 of the service consumer, e.g., whether any outage has serious business impact or if the service consumer's operations are able to tolerate outages of up to several minutes without serious business impact. When the prospective service consumer 106 has completed selecting APIs and providing the requested information, the service consumer 106 may select a continue button 316, or if the service consumer wishes to backtrack the service consumer may select a back button 318.

FIG. 4 illustrates another example of a user interface portion 400 that may be presented to a prospective service consumer to obtain additional requested information. The user interface portion 400 may request additional information from the prospective service consumer, such as whether the service consumer application sends or receives secret data, as indicated at 402. Further, as indicated at 404, the user interface portion 400 may inquire as to who will use the prospective service consumer's application, such as consumers, merchants, software development engineers, managers, lawyers, or others. For example, the security service may establish different whitelisting rules for different types of information depending on who will use the prospective service consumer's application 112. Accordingly, a service consumer application 112 that provides information to members of the public, such as consumers, may be slated to receive different portions of the information provided by an API as opposed to, for example, a service consumer application 112 that provides information to managers or lawyers within the enterprise. Furthermore, the requested additional information may also include the region of the prospective service consumer's primary development center as indicated at 406, and a request for the e-mail address of the manager responsible for the services provided by the prospective service consumer 106, as indicated by data entry box 408.

Accordingly, the user interface 126 may provide the ability for a service provider to obtain a large amount of information from a prospective service consumer to enable the service provider to decide on a level of access that a particular service consumer should have with respect to a particular service. For example, the user interface 126 enables the service provider to determine why the prospective service consumer will be calling the particular service, whether the prospective service consumer will be using the service correctly and efficiently, and can determine whether the service consumer will be accessing secure data. The user interface 126 also obtains contact information for a responsible party at the service consumer, and can identify the service consumer's cost-center to enable allocation of costs of operation back to the service consumer. Furthermore, the user interface 126 can determine the prospective service consumer's availability tier, such as whether the service provider can throttle or restrict access of the service consumer during an emergency situation.

In addition, the user interface 126 enables the establishment of access policies 122 customized to each service consumer for each service. For example, questions provided in the user interface may establish whitelisting rules as part of the access policies 122 such as the maximum call rate allowed to each service consumer for particular APIs (e.g., maximum transactions per second, maximum transactions per minute, etc.). Other whitelisting rules established may include the availability tier of the service consumer, the ability to label service inputs and outputs as secure (and require additional security review for access to these secure services), and the ability for service consumers to opt out of accessing or receiving secure data. Additionally, in some implementations, the access policies granted to each service consumer may periodically expire, and require the service consumer to reapply for access to a particular service. In addition, security service may enable service providers to restrict access of service consumers who violate the access policies 122, such as when the service consumers exceed their maximum allowed call rate, or the like. The restriction of access may be executed at a granularity of restricting access of a particular service consumer at a service level and or an individual API level.

Furthermore, the security service 102 enables service providers to efficiently manage and monitor the service consumers that are authorized to access their services. For example, a service provider may access the security service 102 to view any pending access requests received from prospective service consumers, determine which service consumers are authorized to access which APIs at the service provider, and view a history of who has requested access to a service and/or approved access to a service. Additionally, the logging function of the security service 102 enables a service provider to be notified of abnormalities in client call patterns, view which clients have called which APIs, determine which clients no longer require access to particular APIs, allocate costs of operation back to particular service consumers, determine whether a particular service is meeting the runtime service level agreements for particular service consumers, and monitor other information that assists the service providers in the management and provision of their services.

Example Roles, Relationships and Interactions

Figure 5:
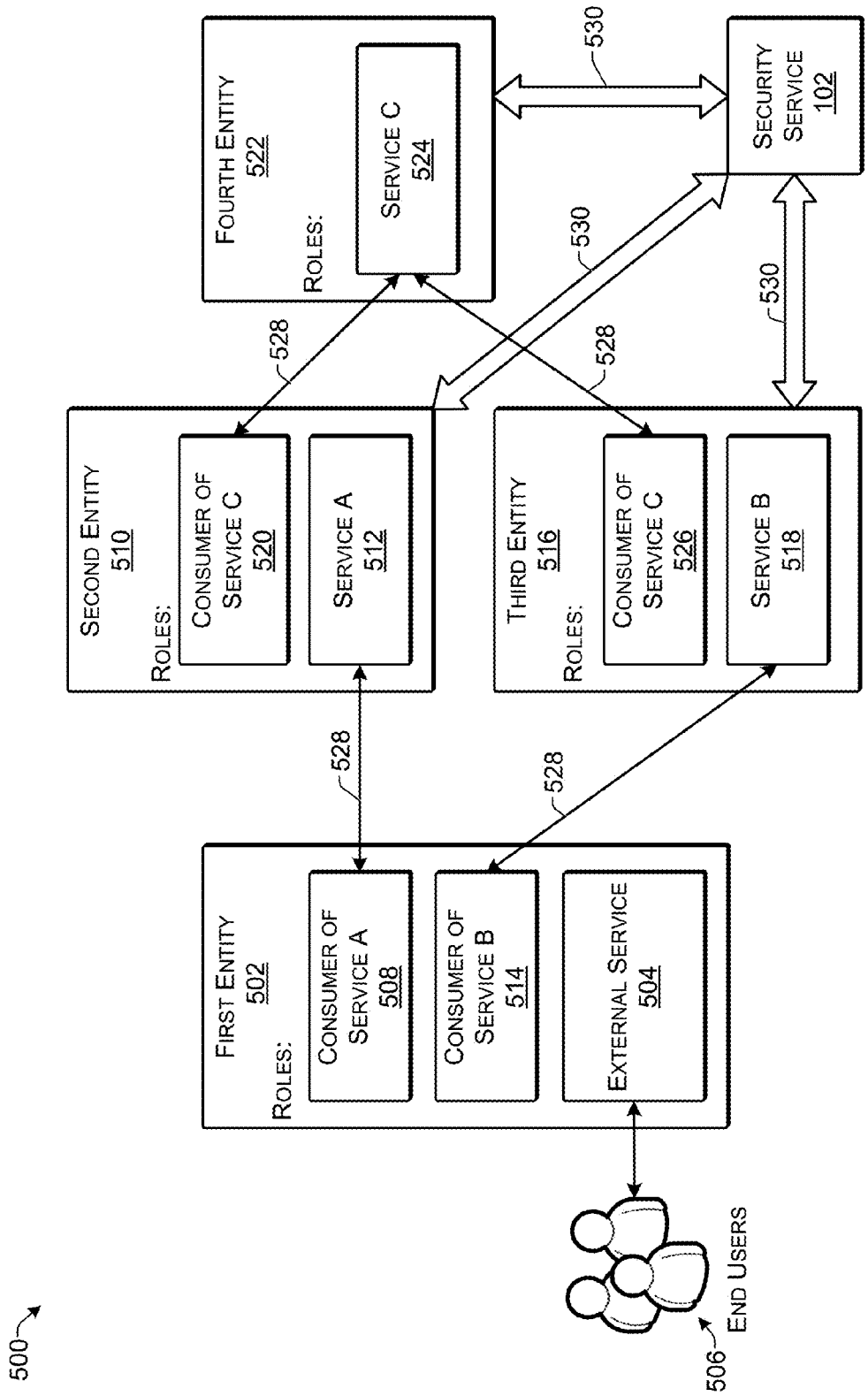
FIG. 5 illustrates an example of multiple entities engaging in multiple roles as service and/or client according to some implementations.

FIG. 5 is an example framework 500 illustrating how different entities may perform various different roles (e.g., service provider, service consumer, or both service provider and service consumer) according to some implementations. In this example, a first entity 502 may be a provider of an external service 504 to one or more end users 506, such as consumers, employees of an enterprise, or the like. In order to provide the external service 504, the first entity 502 may need to subscribe as a service consumer to a plurality of services. For instance, the first entity 502 may include a consumer of service A 508 that uses services provided by a second entity 510. For example, the second entity 510 may provide a service A 512 that, when called by the consumer of service A 508, provides information or other services to the consumer of service A 508. Further, the first entity 502 may also include a consumer of service B 514 that uses services provided by a third entity 516. For example, the third entity 516 may provide a service B 518 that provides services to the consumer of service B 514 at the first entity 502.

Furthermore, the second entity 510 may include a consumer of service C 520 that accesses services provided by a fourth entity 522, such as to enable the service A 512 to provide the service A to the consumer of service A 508. The fourth entity 522 may include a service C 524 that provides information or other services to the consumer of service C 520 to enable functionality of the service A 512. Similarly, the third entity 516 includes a consumer of service C 526 that obtains information or other services from the service C 524 of the fourth entity 522 for use by the service B 518 when providing the service B to the consumer of service B 514.

From this example, it will be apparent that certain entities or applications may adopt different roles as client and/or service during performance of their functions. Further, communications 528 between the various service consumers (clients) and services may be signed and authenticated using secret keys. For example, as discussed above, each service provider may register a service with the security service 102, and each service consumer may apply to the security service 102 to obtain permission to access a desired service. Following registration, each service consumer and service is issued a secret key, and each service consumer can use a particular secret key to sign a service request to access a corresponding particular service. Additionally, following registration, the registered services may communicate with the security service 102, as indicated by arrows 530, during runtime. For example, the services 512, 518 and 524 may perform periodic synchronization with the security service 102 and/or provide logging information to the security service 102. Further, it should be noted that the example of FIG. 5 is just one nonlimiting example of the numerous types of service consumer and service interactions that may be managed and secured according to the implementations disclosed herein.

Figure 6:
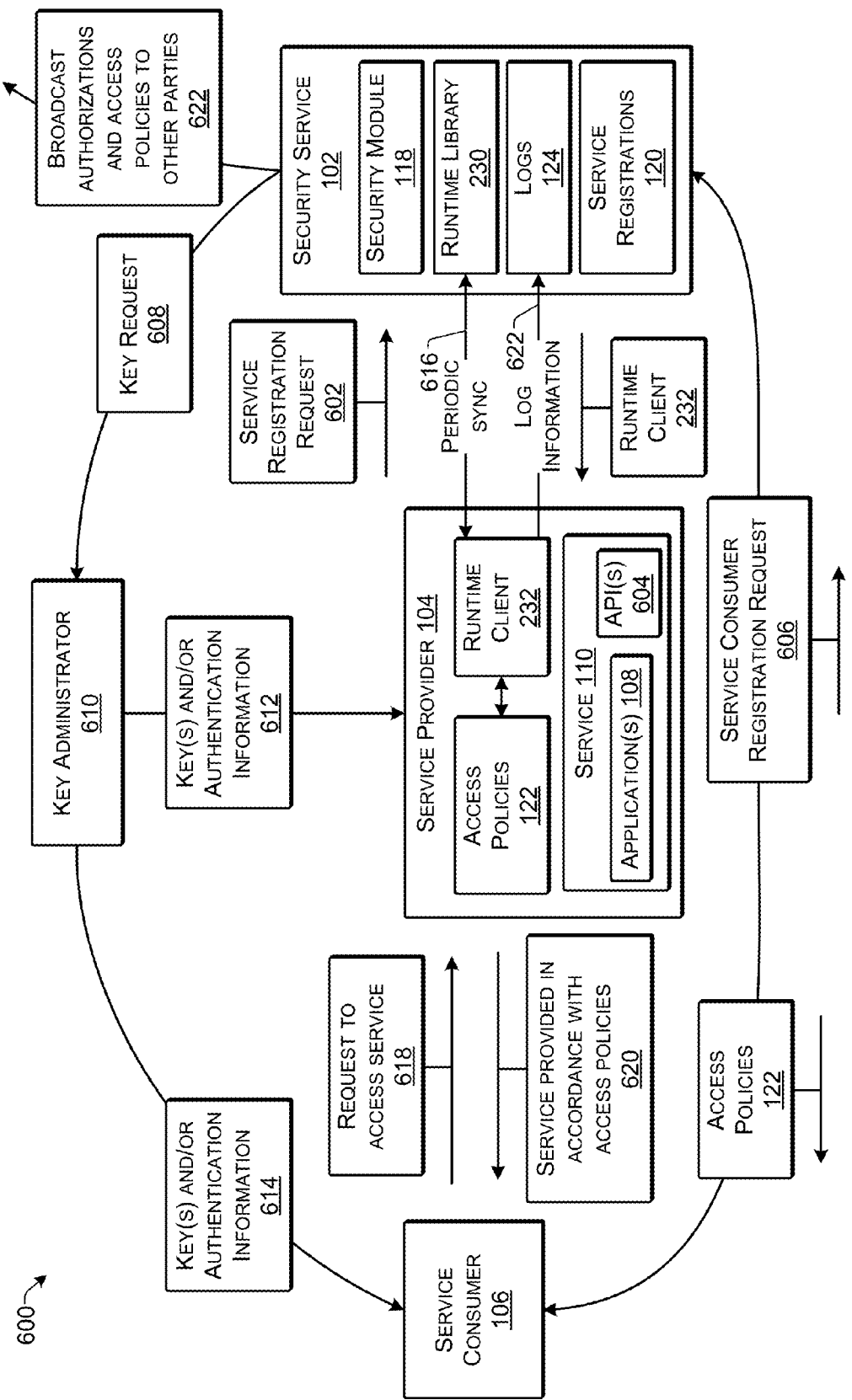
FIG. 6 illustrates an example of registration, periodic synchronization and service access according to some implementations.

FIG. 6 illustrates an example framework 600 including details and functions of the security service 102 according to some implementations. In this example, the security service 102 is configured to receive a service registration request 602 from a service provider 104 for registering a service 110 with the security service 102. For example, the service 110 may include one or more applications 108 and one or more APIs 604. As described above, the service provider 104 may access the user interface 126 (not shown in FIG. 6) provided by the security module 118 to register the service 110 with the security service 102. Furthermore, a service consumer 106 that wishes to access the service 110 may supply a service consumer registration request 606 to the security service 102, also through the user interface 126, as described above, such as with respect to FIGS. 3 and 4.

Following the approval of the service consumer registration request 606 by the service provider 104, as described above, the security service 102 may send a key request 608 to a key administrator 610. In response, the key administrator 610 sends secret key(s) and/or authentication information 612 to the service provider 104, and also sends a secret key and/or authentication information 614 to the service consumer 106. Additionally, in some implementations, the service consumer 106 may be provided with some or all of the access policies 122 that apply to the particular service consumer 106. This can enable the service consumer 106 to proactively comply with the access policies 122, such as by throttling the rate of access requests made to the service 110 so as to not exceed an agreed-upon level.

Furthermore, the security service 102 may provide the runtime client 232 to the service provider 104, which may include access policies 122 to be applied when providing the service 110 to the service consumer 106. For example, the access policies 122 may include whitelisting rules as described above, and other authorization information and requirements to be applied when the particular service consumer 106 accesses the particular service 110. The runtime client 232 may periodically access the runtime library 230 maintained by the security service 102 using a periodic synchronization 616 to ensure that the access policies 122 are current. In some implementations, the periodic sync 616 may take place, for example, at intervals of one minute or less. For example, the periodic sync 616 may return updates to whitelisting rules or other access policies 122, may return information regarding a newly authorized service consumer, or the like.

The service consumer 106 may use the secret key and/or authentication information 614 to sign an access request 618 to access the service 110. The service 110 receives the access request 618 and uses the secret key and/or authentication information 612 to validate the access request 618 as being from an authorized client. For example, the runtime client 232 may validate the access request 618 and, on determining that the request is valid, may apply the access policies 122 for providing the service 110 to the service consumer 106. Accordingly as indicated at block 620, the service is provided to the requesting service consumer 106 in accordance with the access policies 122. Furthermore, the runtime client 232 may periodically provide log information 622 for storage in logs 124 maintained by the security service 102. For example, the log information 622 may indicate which service consumers have accessed the service 110, how frequently the service consumers access the service 110, the type and quantity of information provided to the service consumers, and the like. In some implementations, the security module 118 may access and monitor the logs 124 to determine compliance with the access policies 122 in the runtime library 230 and to attempt to detect any anomalies, security breaches, or the like.

Additionally, some implementations may include a periodic "baselining" in which access permissions previously granted to service consumers expire on a periodic basis, such as annually, and the service consumers must re-verify the need to access certain information. For example, the security module 118 of the security service 102 may monitor the service registrations 120 to determine when the predetermined period for re-authorization is nearing expiration for each service consumer. The security module may send the service consumer 106 a notification to reapply for access to the service 110.

Furthermore, in some implementations, changes in access policies, the approval of new authorizations, and the like, may be broadcast other parties within the enterprise, as indicated at block 622. For example, certain entities in the enterprise may wish to monitor which service consumers have access to which services and to which portion of those services. Accordingly, these entities may subscribe to receive broadcasts of each approved change to access policies, such as changes to whitelisting rules and access authorizations.

Data Masking

Figure 7:
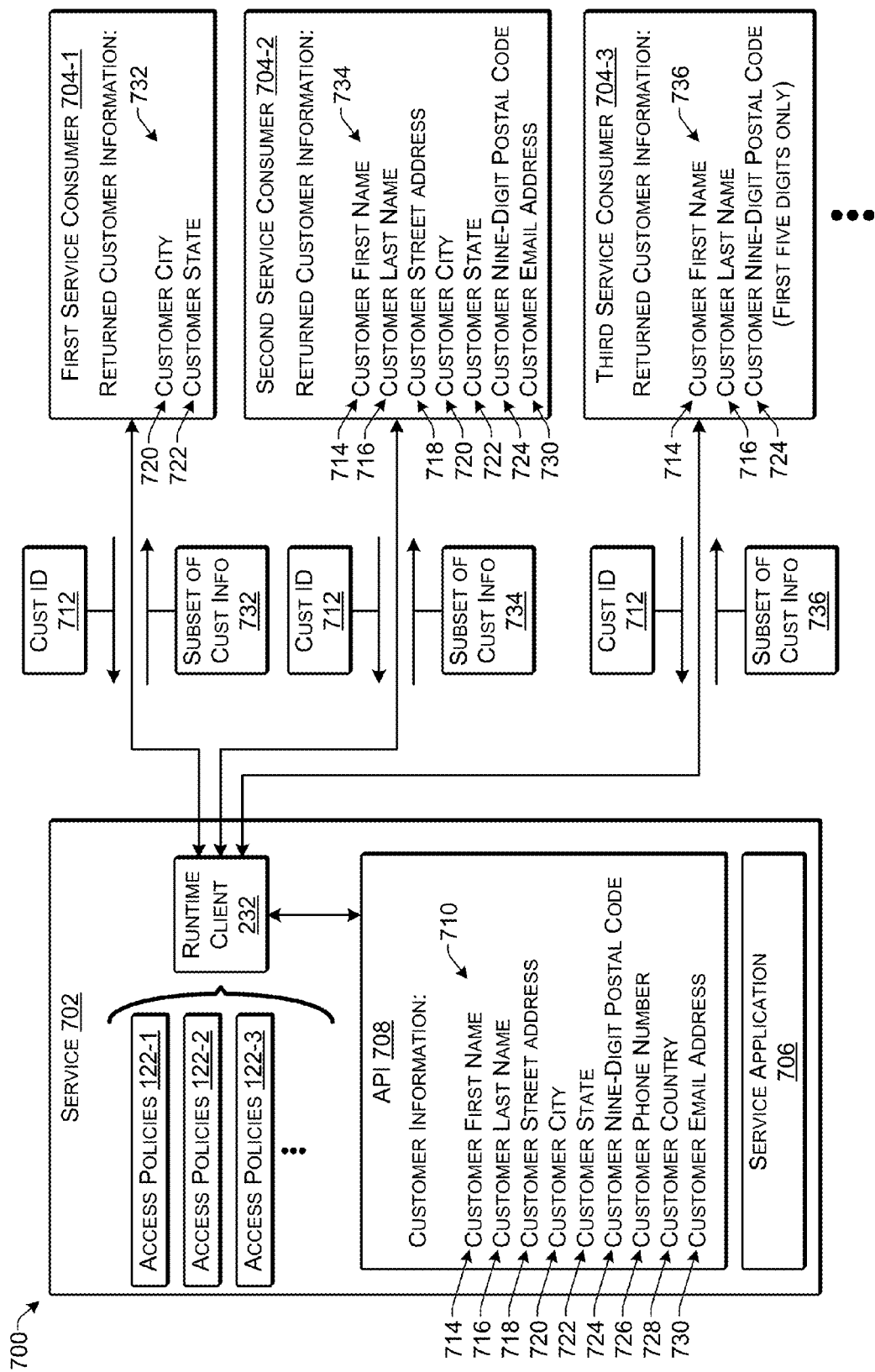
FIG. 7 illustrates an example of using information masking to provide subsets of information to service consumers according to some implementations.

FIG. 7 illustrates an example framework 700 that depicts masking of information provided by a service 702 to a plurality of different service consumers 704-1, 704-2, 704-3, . . . , based on corresponding access policies 122-1, 122-2, 122-3, . . . , established for each service consumer 704. In this example, suppose that the service 702 includes a service application 706 that provides or utilizes an API 708. The API 708 in this example provides customer information 710 for a particular customer in response to receiving a customer ID number 712 in a call from a service consumer 704. For instance, the customer information 710 includes a first quantity of information that comprises a customer first name 714, customer last name 716, customer street address 718, customer city 720, customer state 722, customer nine-digit postal code 724, customer phone number 726, customer country 728, and customer e-mail address 730.

Furthermore, suppose that when the first service consumer 704-1 applies to the security service 102 described above for access to the service 702, the access policies 122-1 (i.e., the whitelisting rules) established for the service 702 and the first service consumer 704-1 specify that the first service consumer 704-1 only requires the customer city 720 and the customer state 722 for carrying out its function. For example, the first service consumer 704-1 may be an application that performs a mapping function showing concentrations of customers based on city.

Additionally, suppose that when second service consumer 704-2 applies to the security service 102 for access to the service 702, the access policies 122-2 established for the second service consumer 704-2 specify that the second service consumer 704-2 only requires the customer first name 714, customer last name 716, customer street address 718, customer city 720, customer state 722, customer nine-digit postal code 724, and customer email address 730. For example, the second service consumer 704-2 may be an application that provides shipping information for an identified customer.

In addition, suppose that when the third service consumer 704-3 applies to the security service 102 for access to the service 702, the access policies 122-3 established for the third service consumer 704-3 specify that the third service consumer 704-3 only requires customer first name 714, customer last name 716, and the first five digits of the customer's nine-digit postal code 724. For example, the third service consumer 704-3 may be an application that carries out an authentication function.

According to some implementations, when each service consumer 704 calls the API 708 to obtain customer information 710, each service consumer 704 only receives a subset of the customer information 710, based on the access policies 122 established for the service 702 and the corresponding service consumer 704. For example, the first service consumer 704-1 may access the API 708 by the call and may include a particular customer ID 712 as a parameter in the call. The runtime client 232 at the service 702 receives the call to the API 708 from the first service consumer 704-1 and authenticates the first service consumer 704-1 as described above, such as by checking that the access call is signed using the consumer secret key previously provided to the first service consumer 704-1. Following authentication of the access call, the runtime client 232 checks the access policies 122-1 that apply to the first service consumer 704-1 to determine how much of the available customer information 710 the first service consumer 704-1 is authorized to receive.

In response to the access call from the first service consumer 704-1, and based on the access policies 122-1, the service 702 provides a subset 732 of customer information 710 obtained from the API 708 to the first service consumer 704-1. The providing of the subset 732 of customer information may be accomplished in several ways. For example, the runtime client 232 may instruct the API to return the subset 732 of the customer information. Alternatively, the runtime client 232 may obtain the customer information 710 on the API 708 and the runtime client 232 may extract and return the subset 732.

The subset 732 of customer information provided to the first service consumer 704-1 is a subset of the customer information 710, as specified by the access policies 122-1, that includes only the customer city 720 and the customer state 722. Similarly, when the second service consumer 704-2 makes a call to the API 708, the service 702 returns a subset 734 of customer information that includes only the customer first name 714, customer last name 716, customer street address 718, customer city 720, customer state 722, customer nine-digit postal code 724, and customer e-mail address 730. Additionally, when the third service consumer 704-3 makes a call to the API 708, the service 702 returns a subset 736 of customer information that includes only the customer first name 714, customer second name 716, and the first five digits of the customer nine-digit postal code 724. Accordingly, implementations herein are able to mask data provided by an API to each service consumer 704 based on the actual needs of the service consumer 704 for particular data, as determined when the service consumer 704 registers to access the particular service 702.

Access Blocking

Figure 8:
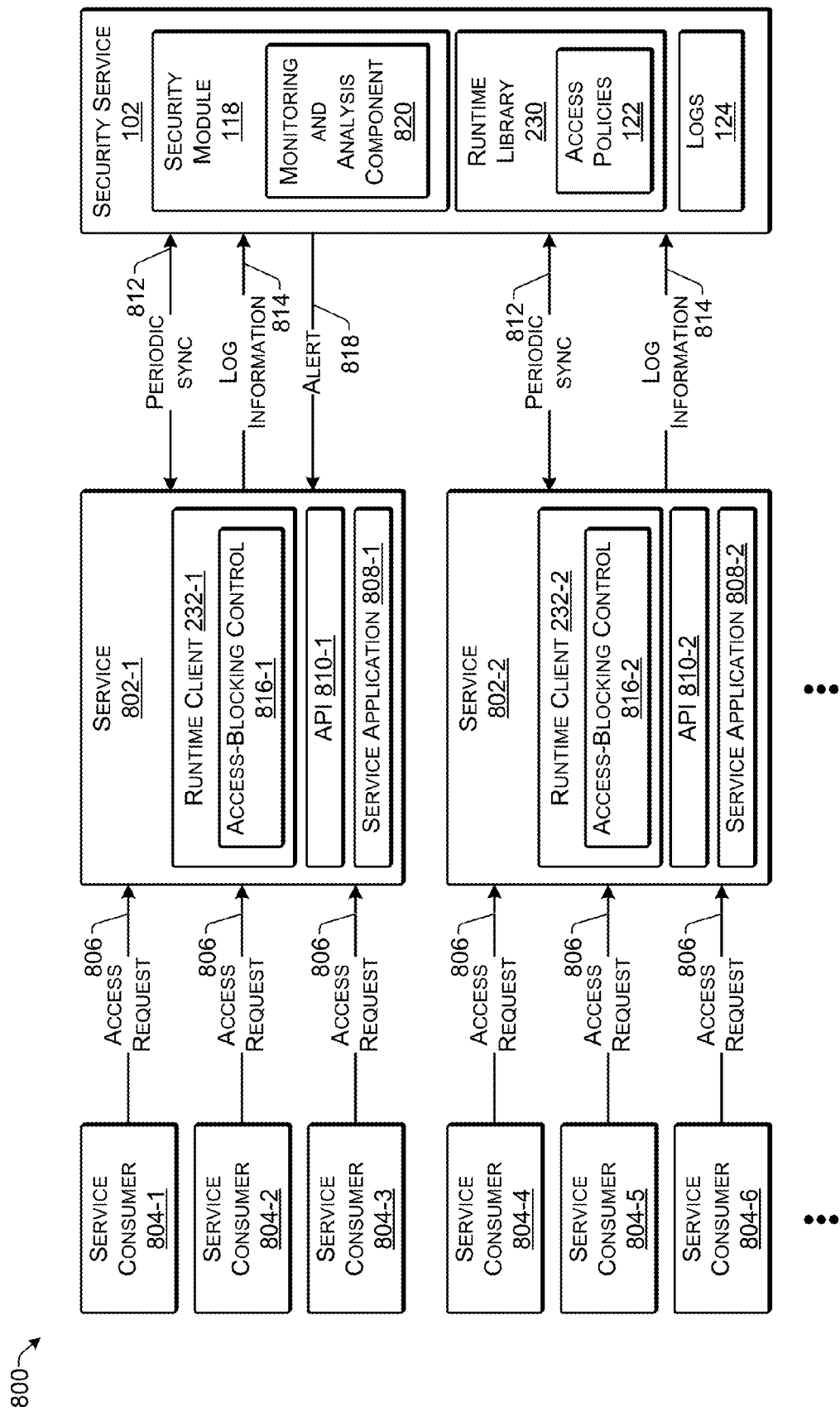
FIG. 8 illustrates an example of service consumer blocking according to some implementations.

FIG. 8 illustrates an example framework 800 that depicts contingencies that may be implemented to address abuse of service, security breaches, software glitches and/or system failures according to some implementations herein. In this example, a plurality of services 802-1, 802-2, . . . , and a plurality of service consumers 804-1 through 804-6, . . . , are registered with the security service 102, as described above. Accordingly, each service consumer 804 may submit a signed access request 806 to obtain a desired service from one of the services 802. Each service 802 may include a service application 808 for providing the service and an API 810 for responding to the access requests 806 from the service consumers 804. Furthermore, each service 802 may include the runtime client 232 that performs the security functions described above at each service 802.

As discussed above, each runtime client 232 may execute a periodic synchronization 812 with the runtime library 230 maintained by the security service 102. For example, the periodic synchronizations 812 enable each runtime client 232 to obtain current access policies 122, including whitelisting rules, updated or new service consumer authorizations, and the like. Additionally, each runtime client 232 may periodically provide log information 814 to the security service for storage in the logs 124.

It may happen that a service consumer 804 exceeds the expected usage of a service 802. For example, as mentioned above, when each service consumer 804 applies to access a service, the service consumer may provide an estimate of the peak number of access requests that the service consumer expects to make. When a service consumer 804 substantially exceeds this estimated number, this can cause latency problems at the service, denial of service to other service consumers 804, and the like. Accordingly, implementations herein may provide an access-blocking control 816 for blocking access requests of a particular service consumer 804 to one or more APIs 810 and/or service applications 808. For example, the runtime client 232-1 at the service 802-1 may include an access-blocking control 816-1. Similarly, the runtime client 232-2 at the service 802-2 may include an access-blocking control 816-2.

As an example, suppose that service consumer 804-1 begins to make a large number of access requests 806 to the service 802-1. For instance, the service consumer 804-1 may be the subject of a security breach that causes the service consumer to make an abnormally high number of access requests 806, the service consumer 804-1 may have suffered a software glitch causing an abnormally high number of access requests 806, or the like. The service provider for the service 802-1 may become aware of this situation in any of several manners, such as by notification from the service application 808-1, by notification from other monitoring software available to the service provider (not shown), or by an alert 818 issued by the security service 102 in view of the log information 814 received from the service 802-1. For example, the security service 102 may include a monitoring and analysis component 820 that monitors and analyzes the logs 124, identifies anomalies in use, non-compliance with access policies 122, or the like. When an anomaly or non-compliance is detected, the monitoring and analysis component 820 may issue an alert to one or more of the related service providers.

In response to becoming aware that a service consumer (such as the service consumer 804-1 in this example) is exceeding an allowed quota or an expected number of access requests, the service provider for the service 802-1 may activate the access-blocking control 816-1 to block access of the particular service consumer 804-1 to the API 810-1 and/or the service application 808-1. Additionally, because the blocking of a particular service consumer may take place at a service or API level, when a service provider provides multiple different services, the service provider may block access of the particular service consumer to a particular service or API, while still permitting access of this particular service consumer to other services or APIs provided by the service provider.

Accordingly, implementations herein provide the provider of a service 802 with the ability to block an individual service consumer 804 at the host level, at the service application level, or at the API level, without blocking access of other service consumers 804 to the API 810-1 or the service application 808-1. Consequently, rather than resulting in a denial of service to all authorized service consumers, an unexpected or abnormally high number of access requests from a particular service consumer can be curtailed without loss of service to the other service consumers. Further, in some implementations, the access-blocking control 816 can be automated to act to block an offending service consumer 804 whenever the service consumer's peak access request rate exceeds the service consumer's estimated or allotted access request rate limit by a predetermined threshold, such as by exceeding the peak request rate by a predetermined percentage, or the like.

In addition, because each service consumer 804 has registered with the security service 102, each particular service consumer 804 has knowledge of the access policies 122 that apply to that particular service consumer 804. For example, when the service consumer 804 applies for access to a particular service, the service consumer may be asked to provide an estimate of the number of access request that the service consumer expects to make to the particular service. Accordingly, should the service consumer substantially exceed the estimated number of access requests, the service provider may block the service consumer from a particular service application or a particular API. Consequently, the service consumer 804 can proactively take measures to throttle the number of access requests actually made to the service based upon the estimated number of access requests that service consumer provided in its application for access to the service. Furthermore, should the service consumer 804 anticipate in advance that it will substantially exceed the estimated number of access requests, the service consumer 804 may submit a new application to the security service 102 with an increased estimate of the anticipated peak number of access requests that will be made to the service 802.

Example Processes

Figure 9:
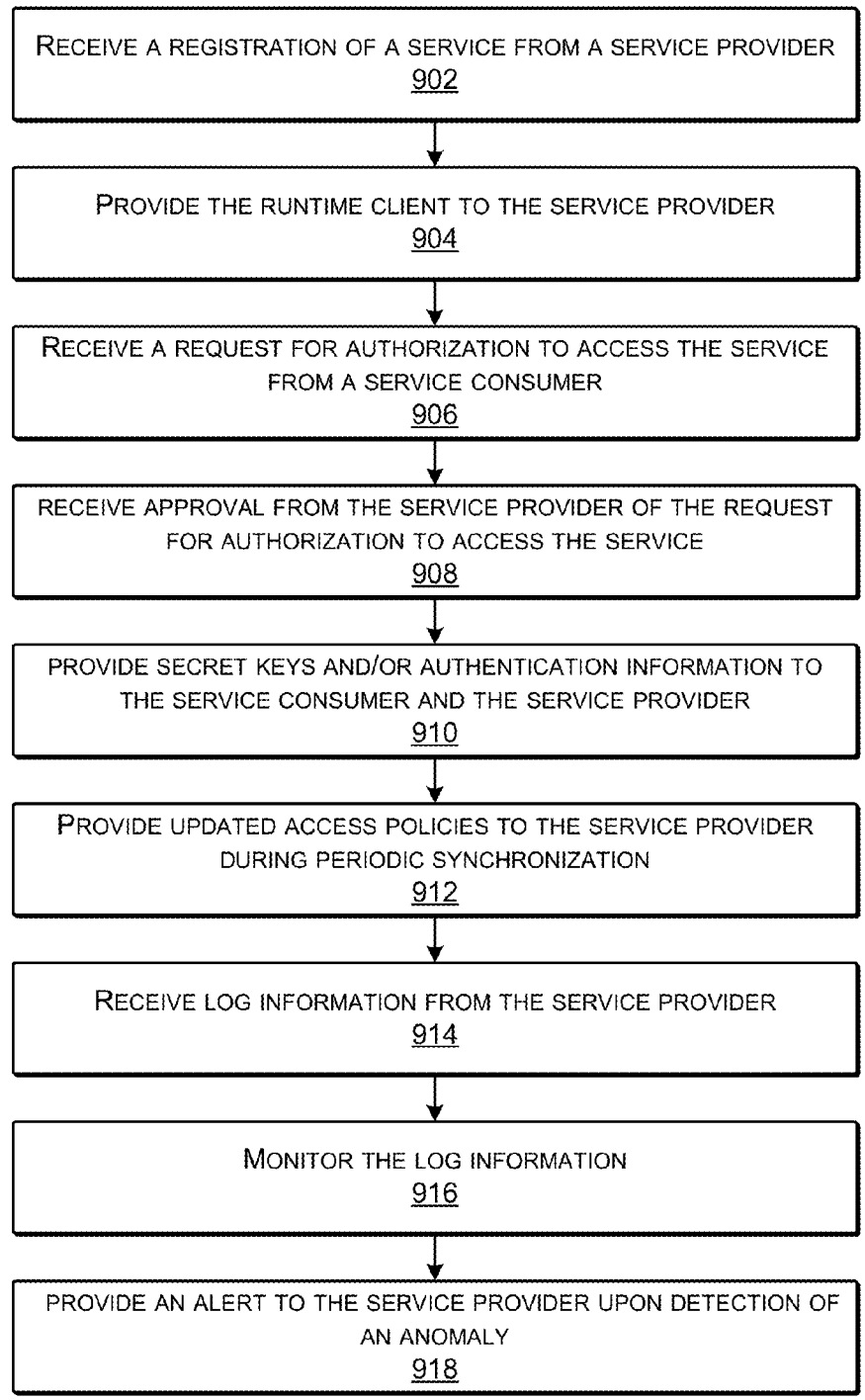
FIG. 9 is a flow diagram illustrating an example process for securing services and intra-service communications according to some implementations.
Figure 10:
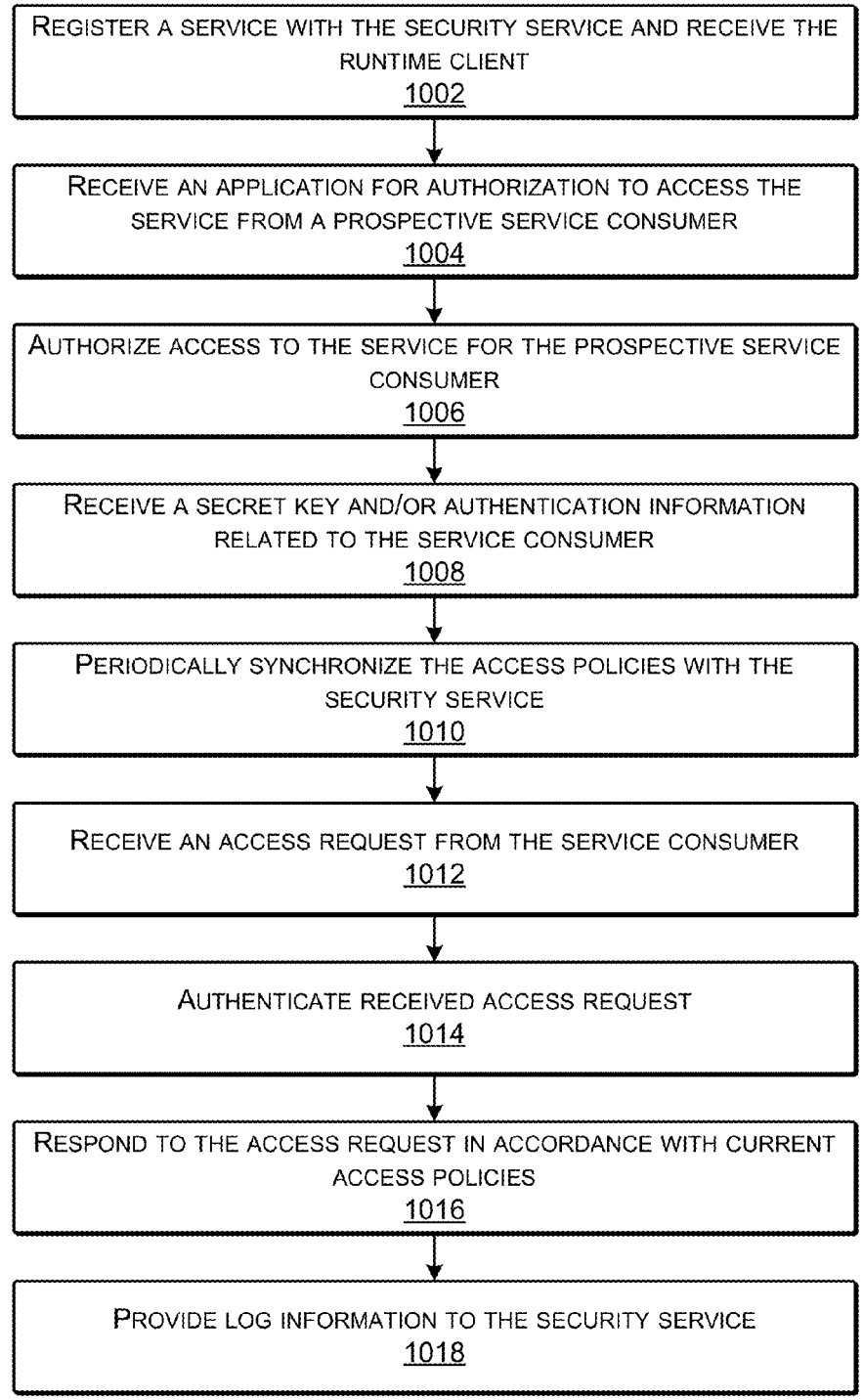
FIG. 10 is a flow diagram illustrating an example process for securing services and intra-service communications according to some implementations.

FIGS. 9 and 10 illustrate example processes for implementing the techniques described above for securing services and intra-service communications. These processes are illustrated as a collection of operations in logical flow graphs, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the frameworks, architectures and environments described in the examples herein, although the processes may be implemented in a wide variety of other architectures, apparatuses or environments.

FIG. 9 is a flow diagram illustrating an example process 900 for securing services and intra-service communications that may be executed by the security service 102 according to some implementations herein.

At block 902, the security service 102 receives, from a service provider, a registration for registering a service. For example, the service provider may access the user interface 126 to register one or more services with the security service 102. For example, the registration may identify particular APIs that may be accessed by service consumers, whether the APIs provide secure or sensitive information, and so forth.

At block 904, the security service 102 provides the runtime client 232 to the service provider. For example, the service provider may download and install the runtime client 232 and any current access policies 122 for the particular service.

At block 906, the security service 102 receives a request for authorization to access the service from a prospective service consumer. For example, a service consumer that wishes to access a registered service may submit an application through the security service user interface 126. During the application process, the prospective service consumer may be required to provide information regarding how and why the service consumer will use the service, who will have access to information provided to the service consumer by the service, the service level required by the service consumer for the service, whether the service consumer requires access to secured information, and the like.

At block 908, the security service 102 receives approval from the service provider regarding the request from the service consumer to access the service. For example, the security service may notify the service provider that a request for authorization to access the service has been submitted by a service consumer and is pending. The service provider may then review the application of the service consumer for determining whether to authorize access to the service by the service consumer. In some implementations, the application of the service consumer may be forwarded directly to the service provider to facilitate review of the application. In other implementations, the service provider may access the user interface 126 of the security service 102 to review the application of the service consumer. Other variations will also be apparent in view of the disclosure herein.

At block 910, in response to approval of the application by the service provider to allow access to the service for the service consumer, secret keys and/or authentication information may be provided to the service provider and the service consumer. In some implementations, the security service may provide the secret keys and/or authentication information. In other implementations, a separate key management service may provide the secret keys and/or authentication information upon receiving an instruction from the security service 102. In some implementations, the secret keys may be large random numbers, strings, or the like.

At block 912, the security service 102 provides current or updated access policies to the service provider during periodic synchronizations of the access policies. For example, the runtime client at the service provider may perform a periodic synchronization of the access policies such as at time intervals of one minute or less. In other implementations, the security service 102 may periodically push the updated access policies to the runtime client at the service provider, or may provide pushed updates as they occur. Consequently, as new service consumers are authorized to access the service, the access policies are propagated and updated to reflect these changes at the service provider in near real-time.

At block 914, the security service 102 receives log information from the service provider. For example, the runtime client at the service provider may maintain log information regarding each access by a service consumer to the service at the service provider. The runtime client may forward this log information to the security service 102 as it is accumulated, or as a batch on a periodic basis. The log information may provide details regarding which service consumer has called which API, the frequency with which the API is called by each service consumer, and the like.

At block 916, the security service 102 may monitor the log information on behalf of the service provider. For example, the security service 102 may monitor the logs to identify possible anomalies, service consumers that are exceeding their agreed-upon levels of access, or the like.

At block 918, as part of the monitoring process, the security service may provide an alert to the service provider upon detection of an anomaly, violation of access policies, or the like. For example, the alert may be provided to the service provider, and the service provider may take appropriate action in response, such as blocking access of a particular client or the like.

FIG. 10 is a flow diagram illustrating an example process 1000 that may be performed by a service provider for securing services and intra-service communications according to some implementations.

At block 1002, the service provider registers a service with the security service 102. For example, the service provider may register a service by accessing the user interface 126 provided by the security service 102. Furthermore, when the service provider registers with the security service, the service provider may receive the runtime client. For example, the first time that the service provider registers with the security service 102, the service provider may be instructed to download and install the runtime client as part of the registration process.

At block 1004, the service provider receives an application for access to the service from a prospective service consumer. For example, as mentioned above, the service provider may receive notification of one or more pending applications for authorization to access the service from prospective service consumers. In response to receiving such a notification, the service provider may access the user interface 126 of the security service 102 to review the application and determine whether to approve or deny the application.

At block 1006, the service provider may authorize access to the service for the prospective service consumer. For example, if the application meets with the requirements of the service provider, the service provider may authorize access to the service for the service consumer. On the other hand, should the application not meet with the requirements of the service provider the service provider may inform the service consumer of deficiencies in the application and/or additional requirements of the service provider.

At block 1008, the service provider receives a secret key and/or authentication information related to the service consumer. The service provider may maintain a plurality of secret keys and/or authentication information pertaining to a plurality of corresponding authorized service consumers.

At block 1010, the access policies of the service provider are periodically synchronized with the security service. For example, in some implementations, the runtime client may perform a periodic synchronization with the security service to obtain any updates to the access policies. Alternatively, in some implementations, the security service may push any updates to the access policies to the service provider. In either event, the access policies may be updated in near real-time, such as in one-minute intervals or less.

At block 1012, the service provider receives an access request from the service consumer for accessing the service. For example, following acceptance by the service provider of the application of service consumer for access the service, the service consumer may begin to access the service. In some implementations, the service consumer may access the service by making calls to one or more APIs provided by the service.

At block 1014, in response to receiving the access request from the service consumer, the runtime client may check the authenticity of the access request. For example, the service consumer, when submitting the access request, may sign the request with a secret key or other authentication information. Accordingly, the runtime client may use the service provider's secret key to check the signature of the access request for authenticity.

At block 1016, the service may respond to the access request in accordance with current access policies. Following authentication approval, the runtime client may determine the access policies that apply to the particular service consumer that has submitted the access request. The runtime client may then ensure that the response to the access request is in accordance with the access policies. For example, certain portions of the information provided in response to the access request may be masked or otherwise not provided to the particular service consumer when the access policies dictate that the particular service consumer should not receive those certain portions of information. Accordingly, the response provided to the service consumer may include only a subset of a quantity of information available from the API.

At block 1018, the runtime client provides log information to the security service. For example, the runtime client may accumulate and maintain log information regarding each access request received from each service consumer, information provided in response to each access requests, latency times corresponding to each access request, and the like. The runtime client may provide the log information to the security service as a batch on a periodic basis, or may provide the log information as it is accumulated.

The example processes described herein are only examples of processes provided for discussion purposes. Numerous other variations will be apparent to those of skill in the art in light of the disclosure herein. Further, while the disclosure herein sets forth several examples of a suitable frameworks, architectures and environments, implementations herein are not limited to the particular examples shown and discussed.

Example Computing Devices

Figure 11:
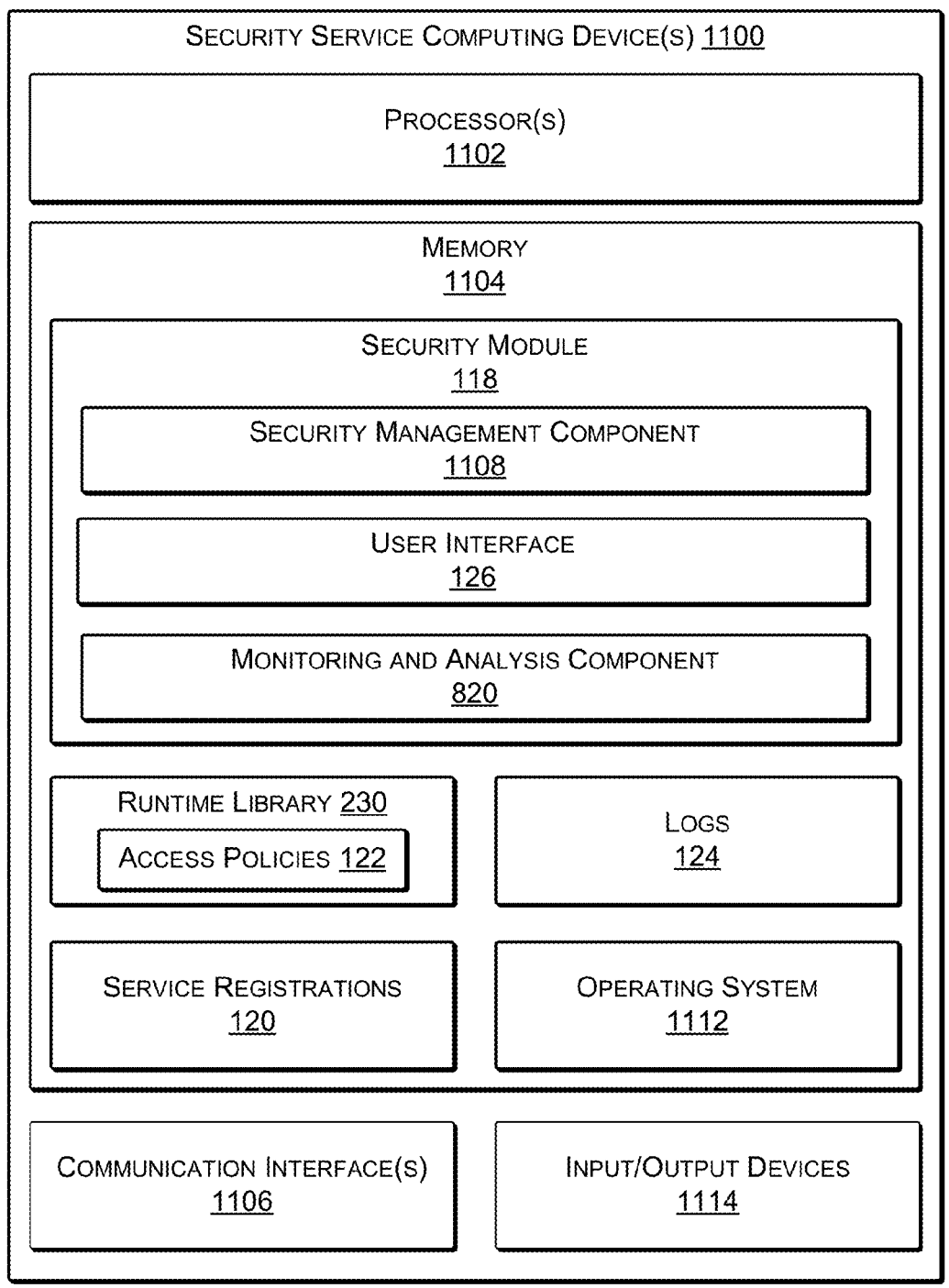
FIG. 11 illustrates select components of an example security service computing device according to some implementations.

FIG. 11 illustrates select components of one or more security service computing devices 1100 that may be used to implement the functionality of the security service 102 according to some implementations. For example, the security service 102 may be hosted on servers or one or more other types of computing devices that may be embodied in any number of ways. For instance, in the case of a server, the security service 102 may be implemented on a single server, a cluster of servers, a server farm or data center, and so forth, although other computer architectures (e.g., a mainframe architecture) may also be used. Further, while the figures illustrate the components of the security service 102 as being present in a single location, it is to be appreciated that these components may be distributed across different computing devices and locations in any manner. Generally, the security service 102 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

In the illustrated example, the security service computing device 1100 includes one or more processors 1102, a memory 1104, and one or more communication interfaces 1106. The memory 1104 may include volatile and nonvolatile memory and/or removable and non-removable media implemented in any type of technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, storage arrays, or any other medium which can be used to store the desired information and which can be accessed by a computing device. Depending on the configuration of the computing device 1100, the memory 1104 may be a type of computer readable storage media and may be a non-transitory storage media.

The memory 1104 may be used to store any number of functional components that are executable by the processors 1102. In many implementations, these functional components comprise instructions or programs that are executable by the processors 1102 and that, when executed, implement operational logic for performing the actions attributed above to the security service 102. Functional components stored in the memory 1104 may include the security module 118 as described above, which may be executed on the processors 1102 for implementing the various functions and features of the security service 102 described herein. In some implementations, the security module 118 may include a security management component 1108 to carry out functions of the security service 102 and manage interoperation of the other components of the security module 118. Other components included in the security module may include the user interface 126 described above, as well as the monitoring and analysis component 820 for monitoring and analyzing the logs 124, generating alerts, and the like. Additional functional components stored in the memory 1104 may include an operating system 1112 for controlling and managing various functions of the security service computing device 1100. The memory 1104 may also store the service registrations 120, the runtime library 230, including access policies 122, and the logs 124. The computing device 1100 may also include many other logical, programmatic and physical components, of which those described above are merely examples that are related to the discussion herein.

The communication interface(s) 1106 may include one or more interfaces and hardware components for enabling communication with various other devices, such as service provider computing devices, service consumer computing devices, and/or user devices over communication links 128-134. For example, communication interface(s) 1106 may facilitate communication through one or more of the Internet, cable networks, cellular networks, wireless networks (e.g., Wi-Fi, cellular) and wired networks. Various different approaches to implementations described herein can be implemented in various environments. For example, the communication links 128-134 may include any appropriate network, including an intranet, the Internet, a cellular network, a LAN, WAN, VPN or any other such network or combination thereof. Components used for such a system can depend at least in part upon the type of network and/or environment selected. Protocols and components for communicating via such networks are well known and will not be discussed herein in detail.

Security service computing device 1100 may further be equipped with various input/output devices 1114. Such devices may include a display, various user interface controls (e.g., buttons, joystick, keyboard, touch screen, etc.), audio speakers, connection ports and so forth.

Figure 12:
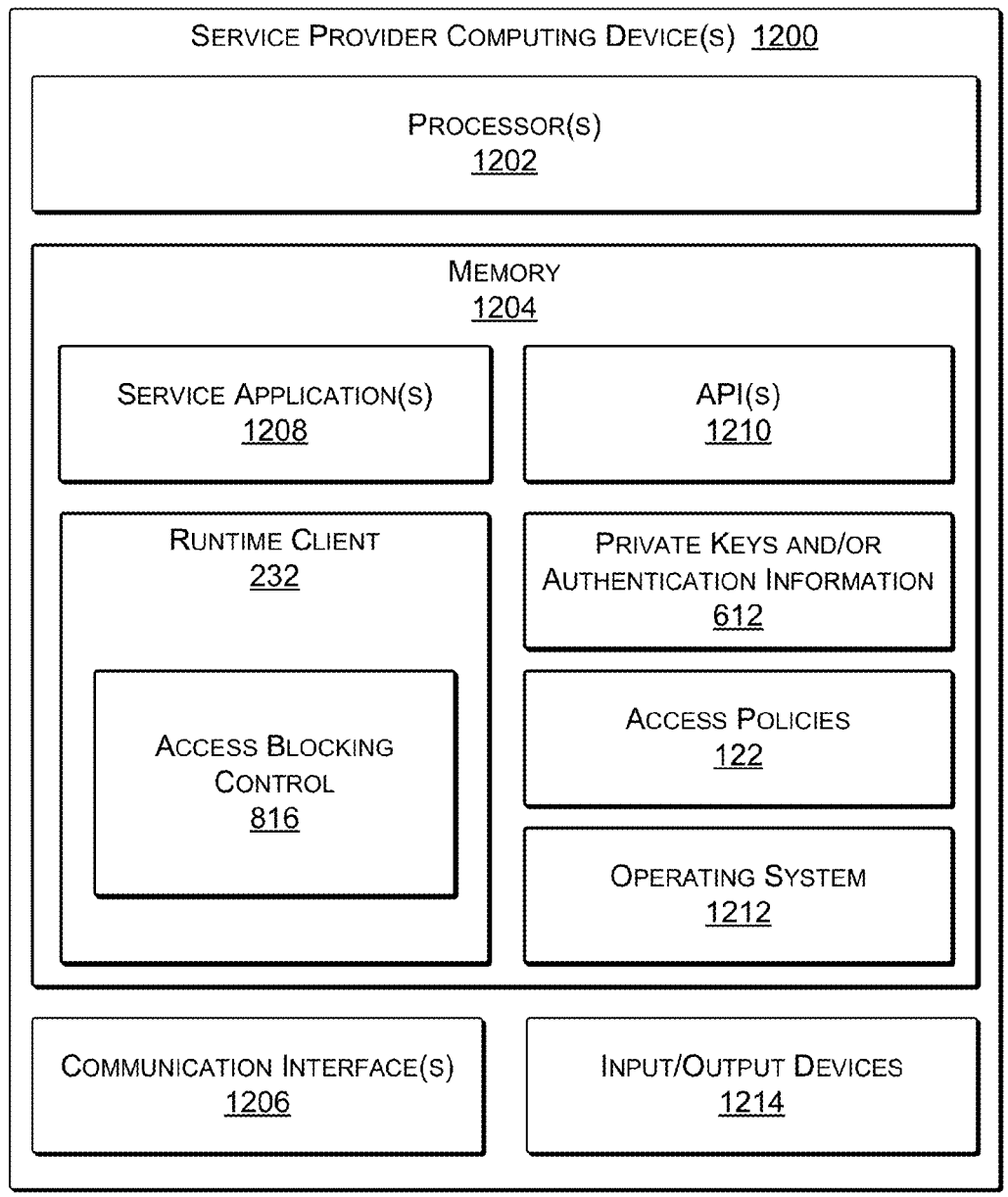
FIG. 12 illustrates select components of an example service provider computing device according to some implementations.

FIG. 12 illustrates select components of one or more service provider computing devices 1200 that may be used to implement the functionality of the service providers described herein according to some implementations. Additionally, in some implementations, the service consumer computing devices may be structurally similar, while containing different functional components. In the illustrated example, the service provider computing device 1200 includes one or more processors 1202, a memory 1204 and one or more communication interfaces 1206. The processors 1202 and the memory 1204 may be any of the types of processors and memory described above with respect to processors 1102 and memory 1104, respectively.

The memory 1204 may be used to store any number of functional components that are executable on the processors 1202. In many implementations, these functional components comprise instructions or programs that are executable by the processors 1202 and that implement operational logic for performing the actions attributed above to the service providers. In addition, the memory 1204 may store various types of data that are referenced by the executable components.

The memory 1204 may store one or more service application(s) 1208 and one or more APIs 1210, which may be executed on the processors 1202 to provide one or more services, as discussed above. The memory 1204 may also store the runtime client 232, including the access-blocking control 816, access policies 122, and private keys and/or authentication information 612, as described above. Memory 1204 may also store an operating system 1212 that may manage and coordinate the various functions of the service provider computing device 1200.

The communication interface(s) 1206 may include one or more interfaces and hardware components for enabling communication with various other devices, such as service provider computing devices, service consumer computing devices, and/or user devices over communication links 128-134. For example, communication interface(s) 1206 may facilitate communication through one or more of the Internet, cable networks, cellular networks, wireless networks (e.g., Wi-Fi, cellular) and wired networks.

The service provider computing device 1200 may further be equipped with various input/output devices 1214. Such devices may include a display and various user interface controls (e.g., buttons, joystick, keyboard, touch screen, etc.), audio speakers, connection ports and so forth.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A method comprising:
under control of one or more processors specifically configured with executable instructions,
  receiving, by a security service from a service provider that is separate from the security service, a registration for a service provided by the service provider, the registration identifying one or more application programming interfaces (APIs) related to the service;
  receiving, by the security service from a first service consumer and a second service consumer, a request to access the service, the requests including an identification of the one or more APIs related to the service to be accessed by the first service consumer and by the second service consumer, the one or more APIs configured to provide a quantity of information in response to access requests from service consumers;

in response to receiving the requests to access the service, sending, by the security service to the service provider, a request to approve the access to the service by the first service consumer and by the second service consumer;

receiving, by the security service, approval from the service provider allowing the access to the service by the service consumer;

issuing a respective secret key to the first service consumer and to the second service consumer for use by the first service consumer and by the second service consumer to provide authentication information when accessing the service; and defining an access policy based, at least in part, on the registration and the request, the access policy:
limiting the first service consumer and the second service consumer access to the one or more APIs related to the service, and the access policy defining a subset of the quantity of information available to the first service consumer and to the second service consumer from the service provider via the one or more APIs, with the subset being different for the first service consumer and for the second service consumer and associated with a third party separate from the first and second service consumer.

2. The method as recited in claim 1, wherein the requests further include an estimation of a frequency that the one or more APIs are to be called by the first service consumer and by the second service consumer.

3. The method as recited in claim 1, wherein defining the access policy specifies one or more features of the one or more APIs that the first service consumer and second service consumer are not permitted to access.

4. The method as recited in claim 1, further comprising providing a runtime client to the service provider, the runtime client utilizing the access policy for responding to requests to access the service received from the first service consumer and from the second service consumer.

5. The method as recited in claim 1, wherein access to the service is provided via a respective direct communication link between the service consumer and the first service consumer and the second service provider.

6. The method as recited in claim 1, wherein first service consumer and the second service consumer access to the one or more APIs related to the service is provided, at the service provider, via a respective direct communication link between the first service consumer and the second service consumer and the service provider.

7. The method as recited in claim 1, wherein the one or more processors comprises a component of a security service in communication with the first service consumer and with the second service consumer and the service provider, and wherein access to the one or more APIs related to the service is provided to the first service consumer and to the second service consumer via a communication link isolated from the security service.

8. The method as recited in claim 7, wherein the first service consumer and the second service consumer have access to the one or more APIs related to the service is provided, at the service provider, via the communication link.

9. The method as recited in claim 1, further comprising:
requesting, from the service consumer, a description indicating how the first service consumer and how the second service consumer intend to use the one or more APIs;
receiving a usage description from the consumer, the usage description indicating how the first service consumer and how the second service consumer intend to use the one or more APIs; and
generating the access policy based at least in part on the usage description.

10. The method as recited in claim 1, further including:
providing a first set of information to the first service consumer in response to the first service consumer calling a first API using a first parameter; and
providing a second set of information to the second service consumer calling the first API using the first parameter, wherein the second set of information is different from the first set of information, and the second service consumer is different from the first service consumer.

11. A method comprising:
receiving, via one or more computing devices, a respective request from a first service consumer and from a second service consumer for authorization to access a service previously registered, the request including an estimated frequency at which the first service consumer and the second service consumer will access the service;
requesting, via at least one of the one or more computing devices, from the first service consumer and from the second service consumer, a usage description associated with one or more application programming interfaces (APIs) of the service configured to provide a quantity of information in response to access requests from service consumers; and
authorizing, via at least one of the one or more computing devices, the first service consumer and the second service consumer to access the service and have access to a subset of the quantity of information based, at least in part, on received approval from a provider of the service that is separate from the one or more computing devices, the subset being different for the first service consumer and for the second service consumer and associated with a third party separate from the first service consumer and from the second service consumer, and wherein the received approval is based at least in part on a response to the requesting of the usage description.

12. The method as recited in claim 11, wherein the requests for authorization to access the service further include an identification of the one or more APIs.

13. The method as recited in claim 11, wherein the requests for authorization to access the service further include contact information for a responsible party at the first service consumer and at the second service consumer.

14. The method as recited in claim 11, further comprising establishing one or more access policies for the first service consumer and for the second service consumer with respect to the service based, at least in part, on the estimated frequency at which the service first service consumer and the second consumer will access the service and the response to the requesting of the usage description, the one or more access policies specifying a limitation on an ability of the first service consumer and of the second service consumer to access the one or more APIs.

15. The method as recited in claim 14, further comprising providing an updated version of the one or more access policies to the service provider during a periodic synchronization of the one or more access policies with the service provider.

16. The method as recited in claim 14, further comprising broadcasting changes to the one or more access policies to one or more third parties that monitor access authorizations of particular service consumers to particular services.

17. The method as recited in claim 11, wherein authorizing the first service consumer and the second service consumer further comprises instructing a key management service to issue secret keys to the first service consumer and to the second service consumer and the service provider to enable the service provider to authenticate the first service consumer and the second service consumer when the first service consumer and the second service consumer accesses the service.

18. The method as recited in claim 11, further comprising:
receiving log information from the service provider, the log information relating to access to the service by the first service consumer and by the second service consumer; and
based at least in part on the log information, sending a notification to the service provider in response to detection of a violation of one or more access policies by the service consumer.

19. The method as recited in claim 11, further comprising, prior to receiving the request from the first service consumer and from the second service consumer, receiving, from a service provider, a registration for the service provided by the service provider, the registration identifying the one or more APIs.

20. The method as recited in claim 11, further comprising:
establishing one or more access policies for the first service consumer and for the second service consumer with respect to the service, the one or more access policies specifying a limitation on an ability of the service consumer to access the one or more APIs; and
providing a runtime client to the service provider, the runtime client utilizing the one or more access policies for responding to requests to access the service received from the first service consumer and from the second service consumer.

21. A system comprising:
at least one computing device configured to implement one or more modules, wherein the one or more modules are configured for:
receiving a request from a first service consumer and from a second service consumer for authorization to access a service, the request including an estimated frequency at which the first service consumer and the second service consumer will access the service;
requesting, from the first service consumer and from the second service consumer, a usage description associated with one or more API of the service configured to provide a quantity of information in response to access requests from service consumers; and
authorizing the first service consumer and the second service consumer to access the service and have access to a subset of the quantity of information based, at least in part, on received approval from a service provider that is separate from the at least one computing device and that provides the service, wherein the received approval is based at least in part on a response to the requesting of the usage description, the subset being different for the first service consumer and for the second service consumer and associated with a third party separate from the first service consumer and from the second service consumer.

22. The system as recited in claim 21, wherein the one or more modules are further configured for, prior to receiving the requests from the first service consumer and from the second service consumer, receiving, from the service provider, a registration for the service provided by the service provider, the registration identifying the API related to the service.

23. The system as recited in claim 22, wherein the one or more modules are further configured for defining an access policy based, at least in part, on the registration, the requests from the first service consumer and from the second service consumer, and the response to the requesting of the usage description, the access policy specifying a limitation on an ability of the first service consumer and of the second service consumer to access the service.

24. The system as recited in claim 21, wherein the access requirements for accessing the service comprise a criticality of the service to the first service consumer and to the second service consumer's operations.

25. The system as recited in claim 21, wherein the service provider is a first service provider and the service is a first service, and wherein the one or more modules are further configured for:
receiving, from a second service provider, a registration for a second service provided by the second service provider;
receiving, from the first service provider, a request for authorization to access the second service; and
authorizing the first service provider to access the second service based, at least in part, on received approval from the second service provider.

26. A method comprising:
receiving, by a computing device, a request from a first service consumer and a second service consumer for authorization to access a registered service configured to provide a quantity of information in response to access requests from service consumers, the request including an estimated frequency at which the first service consumer and at which the second service consumer will access the registered service; and
based at least in part on received approval from a service provider that is separate from the computing device and that provides the registered service, establishing an access policy for the first service consumer and for the second service consumer in connection with the registered service, the access policy being established based, at least in part, on the estimated frequency, wherein the access policy limits access by the first service consumer and by the second service consumer to the registered service and limits access by the first service consumer and by the second service consumer to a subset of the quantity of information that is different for the first service consumer and for the second service consumer and associated with a third party separate from the first service consumer and from the second service consumer.

27. The method as recited in claim 26, further comprising providing a runtime client to the service provider, the runtime client utilizing the access policy for responding to requests to access the registered service received from the first service consumer and from the second service consumer.

28. The method as recited in claim 26, the request further including an identification of one or more application programming interfaces (APIs) related to the registered service that the service consumer intends to access, the method further including requesting, from the first service consumer and from the second service consumer, a usage description indicating how the first service consumer and the second service consumer intends to use one or more application programming interfaces (APIs) of the service.

29. The method as recited in claim 28, wherein the access policy specifies one or more features of one or more application programming interfaces (APIs) related to the registered service that the first service consumer and the second service consumer are not permitted to access.

30. The method as recited in claim 26, further comprising, prior to receiving the request from the first service consumer and from the second service consumer, receiving, from a service provider, a registration for registering a service as the registered service provided by the service provider, the registration identifying one or more application programming interfaces (APIs) related to the registered service.

* * * * *